(12) United States Patent
Hagen

(10) Patent No.: US 8,607,765 B2
(45) Date of Patent: Dec. 17, 2013

(54) METHOD FOR ADJUSTING PRESSURE IN A FUEL TANK AND A FUEL TANK SYSTEM

(75) Inventor: Harald Hagen, Creussen (DE)

(73) Assignee: Audi AG, Ingolstadt (DE)

( * ) Notice: Subject to any disclaimer, the term of this patent is extended or adjusted under 35 U.S.C. 154(b) by 243 days.

(21) Appl. No.: 13/082,978

(22) Filed: Apr. 8, 2011

(65) Prior Publication Data

US 2012/0085424 A1    Apr. 12, 2012

(30) Foreign Application Priority Data

Apr. 10, 2010  (DE) .......................... 10 2010 014 558

(51) Int. Cl.
*F02M 33/02*    (2006.01)
*F02M 33/04*    (2006.01)

(52) U.S. Cl.
USPC .......................................... 123/519; 123/518

(58) Field of Classification Search
USPC ......... 123/519, 518, 516, 520, 521, 457, 458, 123/698
See application file for complete search history.

(56) References Cited

U.S. PATENT DOCUMENTS

| | | | | |
|---|---|---|---|---|
| 5,479,905 A | * | 1/1996 | Ito | 123/520 |
| 2003/0226549 A1 | * | 12/2003 | Takagi et al. | 123/520 |
| 2005/0235969 A1 | | 10/2005 | Suzuki | |
| 2008/0179121 A1 | | 7/2008 | Sauvlet et al. | |
| 2009/0250039 A1 | * | 10/2009 | Song | 123/520 |
| 2009/0250122 A1 | | 10/2009 | Menke | |

FOREIGN PATENT DOCUMENTS

| | | |
|---|---|---|
| DE | 198 38 959 A1 | 3/2000 |
| DE | 10 2007 002 188 | 7/2008 |
| DE | 10 2008 017 004 | 10/2009 |

* cited by examiner

*Primary Examiner* — Mahmoud Gimie
(74) *Attorney, Agent, or Firm* — Henry M. Feiereisen LLC

(57) ABSTRACT

A method and a fuel tank system for adjusting a pressure in a fuel tank are described. Evaporated fuel tank escapes from the fuel tank under overpressure with respect to the ambient and is transferred to a temporary storage for at least one substance of the evaporated fuel. A venting means, through which the evaporated fuel escapes, is controlled by at least one parameter different from a pressure or at least one information provided in form of data. The pressure in the fuel tank can thereby be more variably adjusted.

5 Claims, 1 Drawing Sheet

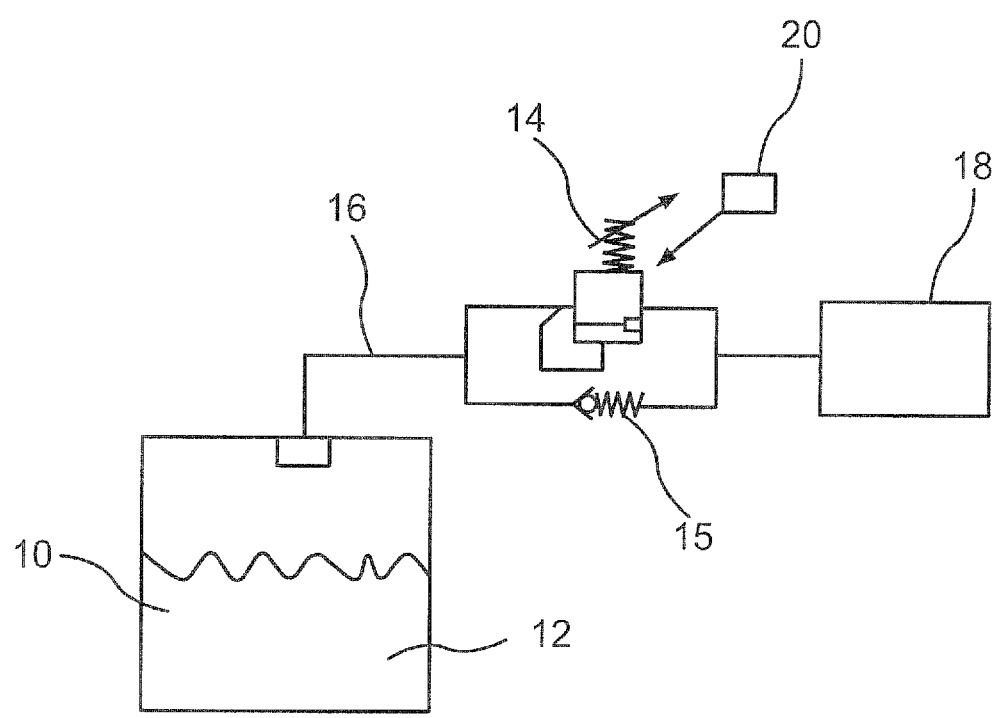

METHOD FOR ADJUSTING PRESSURE IN A FUEL TANK AND A FUEL TANK SYSTEM

CROSS-REFERENCES TO RELATED APPLICATIONS

This application claims the priority of German Patent Application, Serial No. 10 2010 014 558.0, filed Apr. 10, 2010, pursuant to 35 U.S.C. 119(a)-(d), the content of which is incorporated herein by reference in its entirety as if fully set forth herein.

BACKGROUND OF THE INVENTION

The present invention relates to a method for adjusting pressure in a fuel tank and a corresponding fuel tank system.

The following discussion of related art is provided to assist the reader in understanding the advantages of the invention, and is not to be construed as an admission that this related art is prior art to this invention.

It is desirable to reduce the release of hydrocarbons from automobiles with an internal combustion engine into the environment. To this end, automobiles typically have an active charcoal filter which is generally arranged between a tank of the automobile filled with combustible fuel and the environment. This active charcoal filter operates as temporary storage for evaporated hydrocarbons from the automobile. The active charcoal filter is typically regenerated in regular intervals with a flow of fresh air, which takes up the hydrocarbons stored in the active charcoal filter and transports them to the internal combustion engine. These so-called purge phases of the active charcoal filter are intended to ensure that the filter has always sufficient storage capacity for storage of hydrocarbons.

These purge phases cannot be performed very frequently particularly in hybrid vehicles, because the internal combustion engine is only operated intermittently. To ensure that the active charcoal filter has always enough capacity for absorbing hydrocarbons, it has been proposed to reduce the quantity of hydrocarbon vapor generated in the tank by adjusting a predetermined internal tank pressure greater than ambient pressure. To this end, an electrically controllable shutoff valve is arranged between the tank and a connecting line which connects the tank with the active charcoal filter. When the tank is heated, the pressure inside the tank increases to a predetermined, presettable threshold value for the pressure. Hydrocarbons in the fuel then increasingly remain in their liquid phase. The shutoff valve is opened only when this threshold value is exceeded, whereafter hydrocarbon-containing vapors escape from the tank. These vapors are then transferred through the connecting line to the active charcoal filter, where they are absorbed, causing the pressure in the tank to decrease again. As soon as the pressure in the tank is again below the threshold value, the shutoff valve is closed again.

Disadvantageously, the pressure inside the tank cannot be adjusted to be variable. A certain threshold value for the pressure must be preset in advance. A very high pressure is typically selected as the threshold value, allowing vapors to escape from the tank as infrequently as possible. The shutoff valve is used only as an emergency valve in order to prevent damage caused by a very high pressure. The complete tank system therefore requires a rather complex structure to ensure that the tank can withstand regularly occurring high pressures. The manufacturing costs of such tank systems are therefore very high. The absorption capacity of the active charcoal filter is also sometimes not fully utilized.

It is therefore an object of the present invention to provide a method for adjusting pressure in a fuel tank and a fuel tank system, with which the pressure in the fuel tank can be variably adjusted and with which the manufacturing cost of the tank system can be reduced.

It would therefore be desirable and advantageous to obviate prior art shortcomings and to provide an improved method for adjusting pressure in a fuel tank and a fuel tank system with which the pressure in the fuel tank can be variably adjusted, resulting in a reduction of the manufacturing costs of the tank system.

SUMMARY OF THE INVENTION

According to one aspect of the present invention, a method for setting a pressure in a fuel tank includes the steps of providing a venting means for transferring evaporated fuel from the fuel tank under overpressure with respect to ambient pressure to a temporary storage for at least one substance of the evaporated fuel, and controlling the venting means depending on at least one parameter different from a pressure or on at least one information provided in form of data.

Accordingly, no fixed threshold value for the pressure inside the tank space needs to be preset, at which fuel vapor escapes through the venting means from the fuel tank to the temporary storage when the threshold value is exceeded. Actual values for the other parameter or information may be used to open and close the venting means in a suitable manner. The pressure inside the fuel tank of the fuel tank system may thus be variably adjusted. The tank system has a simpler design and can be manufactured more cost-effectively.

If the at least one parameter different from a pressure or the at least one information provided in form of data represents a storage state of the temporary storage, then the storage capacity of the temporary storage can be very well utilized. For example, the evaporated fuel may be allowed to escape from the fuel tank already at a low vacuum in the fuel tank with respect to the environment, if the temporary storage still has ample storage capacity. In this way, the regular occurrence of a high pressure in the fuel tank can be easily and cost-effectively prevented.

According to another advantageous feature of the present invention, the venting means may be controlled depending on an air-fuel ratio A downstream of the temporary storage for a fuel vapor escaping from the fuel tank in a flow direction. The load state of the temporary storage may be easily deduced from this value or from deviations of the ratio from predeterminable standard values. The fuel air ratio A may be measured in a conventional manner with a conventional measuring device.

According to another advantageous feature of the present invention, the venting means may additionally also be controlled depending on the pressure in the tank. For example, a threshold value can be defined for the pressure at which the venting means closes. This can prevent fuel vapor from escaping at very high pressures in the fuel tank which may occur only rarely. Excessive purging of the temporary storage, which may eventually cause release of hydrocarbon-containing vapors into the environment even if the temporary storage still has enough storage capacity, can thus be prevented.

According to another aspect of the present invention, the fuel tank system includes at least one fuel tank for a combustible fuel, a temporary storage for temporary storage of at least one evaporated substance of the fuel, venting means connected to the fuel tank, transfer means for transferring to the temporary storage fuel vapor which escaped through the venting means from the fuel tank at an overpressure with respect to ambient pressure, and a control device controlling the venting means depending on at least one parameter different from a pressure or at least one information provided in form of data.

In this way, the pressure in the fuel tank may be adjusted with much greater variability. It is then no longer necessary to preset a threshold pressure, which typically must allow a large margin for pressures inside the fuel tank. The fuel tank system can be produced more cost-effectively.

According to another aspect of the present invention, by implementing the venting means as a valve, in particular as a proportional valve, control with the control device can be particularly well adapted to the parameter that is different from a pressure and the provided information, respectively. If the proportional valve is implemented as a continuous valve, a continuous change of the valve opening can be attained.

According to another aspect of the present invention, a temporary storage may be implemented as an active charcoal filter which very efficiently absorbs hydrocarbons of the evaporated fuel in a conventional manner.

BRIEF DESCRIPTION OF THE DRAWING

Other features and advantages of the present invention will be more readily apparent upon reading the following description of currently preferred exemplified embodiments of the invention with reference to the accompanying drawing, in which the sole FIG. 1 shows schematically a fuel tank system according to the present invention.

DETAILED DESCRIPTION OF PREFERRED EMBODIMENTS

The depicted embodiment is to be understood as illustrative of the invention and not as limiting in any way. It should also be understood that the figure is not necessarily to scale and that embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to FIG. 1, there is shown a fuel tank 10 of a vehicle filled with a combustible fuel 12. The substances forming the fuel 12, for example the hydrocarbons, evaporate depending on the composition of the fuel 12, and an existing pressure and a temperature inside the fuel tank 10.

To reduce the quantity of hydrocarbon vapor produced in the fuel tank 10, the pressure in the fuel tank 10 is increased above ambient pressure. This is done, for example, by increasing the temperature in the fuel tank 10. However, the fuel vapor still contains a certain quantity of hydrocarbons.

When a proportional valve 14 of the fuel tank 10 is closed, the evaporated fuel with the hydrocarbons initially cannot escape from the fuel tank 10 through a line 16 extending to the active charcoal filter 18, in spite of the overpressure.

Opening and closing of the proportional valve 14 is controlled by a control device 20, which receives actual values for the air-fuel ratio λ from a measuring device measuring this ratio, for example a λ-probe, constructed in a conventional manner. A λ-probe can be used which is located, in relation to a flow direction of the fuel vapor from the fuel tank 10, downstream of the active charcoal filter 18. The load state of the active charcoal filter 18 can be deduced from a deviation of the actual value of λ from predetermined values of λ. If the active charcoal filter 18 has still sufficient capacity for absorbing hydrocarbons from the evaporated fuel, then the control device 20 controls the proportional valve 14 such that evaporated fuel is transferred already at a low overpressure in the fuel tank 10 relative to the ambient through the connecting line 16 to the active charcoal filter 18.

The storage capacity of the active charcoal filter 18 can hereby be exceedingly well utilized. The pressure in the fuel tank 10 is prevented from regularly becoming very large, so that the overall fuel tank system can be manufactured much more cost-effectively.

A vacuum valve 15 is arranged in parallel with the proportional valve 14, but spatially separated from the proportional valve 14. In this way, the fuel tank can be protected from an exceedingly high vacuum.

Alternatively, the control device 20 may also control the proportional valve 14 depending on other parameters or depending on other information. For example, the pre-load of the active charcoal filter 18 can be determined with other special measuring devices. For example, the control can be performed depending on information indicating if the active charcoal filter 18 was just purged with a flow of fresh air, causing the previously occupied absorption sites of the active charcoal filter to be regenerated. The proportional valve 14 can then already be opened at lower pressures in the fuel tank 10 relative to the ambient.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method for setting a pressure in a fuel tank, comprising the steps of:
    providing a proportional valve for transferring evaporated fuel from the fuel tank under overpressure with respect to ambient pressure to a temporary storage for at least one substance of the evaporated fuel; and
    controlling the proportional valve depending on an air-fuel ratio measured by a probe located downstream of the temporary storage, in relation to a flow direction of the fuel vapor from the fuel tank through the proportional valve to the temporary storage.

2. The method of claim 1, wherein the measured air-fuel ratio represents a storage state of the temporary storage.

3. The method of claim 1, wherein the temporary storage comprises an active charcoal filter.

4. A fuel tank system, comprising
    at least one fuel tank for a combustible fuel;
    a temporary storage for temporary storage of at least one evaporated substance of the fuel;
    a proportional valve connected between the fuel tank and the temporary storage;
    a transfer line for transferring to the temporary storage fuel vapor which passed through the proportional valve from the fuel tank at an overpressure with respect to ambient pressure; and
    a control device controlling the proportional valve depending on an air-fuel ratio measured by a probe located downstream of the temporary storage, in relation to a flow direction of the fuel vapor from the fuel tank through the proportional valve to the temporary storage.

5. The fuel tank system of claim 4, wherein the temporary storage is constructed as an active charcoal filter.

* * * * *